United States Patent
Benz et al.

(10) Patent No.: US 7,584,598 B2
(45) Date of Patent: Sep. 8, 2009

(54) METHOD FOR OPERATING A GAS TURBINE AND A GAS TURBINE FOR IMPLEMENTING THE METHOD

(75) Inventors: Eribert Benz, Birmenstorf (CH); Peter Flohr, Turgi (CH); Manfred Wirsum, Baden-Daettwil (CH)

(73) Assignee: Alstom Technology Ltd., Baden (CH)

( * ) Notice: Subject to any disclaimer, the term of this patent is extended or adjusted under 35 U.S.C. 154(b) by 523 days.

(21) Appl. No.: 11/275,478

(22) Filed: Jan. 9, 2006

(65) Prior Publication Data

US 2007/0033918 A1 Feb. 15, 2007

Related U.S. Application Data

(60) Provisional application No. 60/706,777, filed on Aug. 10, 2005.

(51) Int. Cl.
  *F02C 1/06* (2006.01)
(52) U.S. Cl. .................. 60/39.17; 60/39.12; 60/774; 60/781
(58) Field of Classification Search ............... 60/781, 60/774, 39.12, 39.17
  See application file for complete search history.

(56) References Cited

U.S. PATENT DOCUMENTS

| 1,589,704 A | 6/1926 | Kenworthy |
| 4,261,167 A | 4/1981 | Paull et al. |
| 4,488,398 A | 12/1984 | Noguchi |
| 4,785,621 A * | 11/1988 | Alderson et al. ........... 30/39.12 |

(Continued)

FOREIGN PATENT DOCUMENTS

DE  947843  8/1956

(Continued)

OTHER PUBLICATIONS

Mukherjee, D., "State-of-the-are gas turbines—a brief update," ABB Review 1997:4-14;vol. 2; ABB Asea Brown Boveri Ltd., Zurich, Switzerland.

(Continued)

*Primary Examiner*—Michael Cuff
*Assistant Examiner*—Phutthiwat Wongwian
(74) *Attorney, Agent, or Firm*—Cermak Kenealy Vaidya & Nakajima LLP; Adam J. Cormak

(57) ABSTRACT

In a method for operating a gas turbine (11) in a combined cycle power plant (40), air, which is used to burn a syngas that is recovered from coal is drawn in by the gas turbine (11) and compressed, is led to a combustor (18, 19), and a portion of the compressed air is separated into oxygen and nitrogen. An improved degree of efficiency is achieved by virtue of the fact that a gas turbine (11) with reheating is used, which includes two combustors (18,19) and two turbines (16, 17), in which, in the first combustor (18) syngas is burned using compressed air, and the resultant hot gases are expanded and in which, in the second combustor, syngas is burned using the gases coming from the first turbine (16) and the resultant hot gases are expanded in the second turbine (17), and that the nitrogen that occurs in the separation of the air is used to cool the gas turbine (11).

4 Claims, 3 Drawing Sheets

U.S. PATENT DOCUMENTS

| | | | |
|---|---|---|---|
| 4,785,622 A | 11/1988 | Plumley et al. | |
| 4,896,499 A * | 1/1990 | Rice | 60/792 |
| 4,986,499 A | 1/1991 | Ponticelli | |
| 5,081,845 A | 1/1992 | Allam et al. | |
| 5,577,378 A | 11/1996 | Althaus et al. | |
| 6,116,016 A | 9/2000 | Wada et al. | |
| 6,487,863 B1 | 12/2002 | Chen et al. | |
| 6,513,317 B2 | 2/2003 | Arar et al. | |
| 2002/0077512 A1 | 6/2002 | Tendick et al. | |
| 2002/0148213 A1* | 10/2002 | Yu | 60/39.17 |
| 2004/0168468 A1* | 9/2004 | Peyron | 62/656 |
| 2007/0033942 A1 | 2/2007 | Benz et al. | |
| 2007/0033943 A1 | 2/2007 | Benz et al. | |
| 2007/0039468 A1 | 2/2007 | Benz et al. | |

FOREIGN PATENT DOCUMENTS

| | | |
|---|---|---|
| DE | 2503193 | 7/1976 |
| EP | 0622535 | 4/1994 |
| EP | 0634562 | 1/1995 |
| EP | 0773416 | 5/1997 |
| EP | 0795685 | 9/1997 |
| EP | 1098077 | 5/2001 |
| GB | 2335953 | 10/1999 |
| JP | 08218891 | 8/1996 |
| JP | 11030131 | 2/1999 |

OTHER PUBLICATIONS

Search Report for Swiss Patent App. No. CH 20212005 (Apr. 5, 2005).

International Search Report for PCT Patent App. No. PCT/EP2006/065103 (Nov. 9, 2006).

Pending Claims from U.S. Appl. No. 11/275,477 as of Oct. 30, 2008, pp. 1-4.

Pending Claims from U.S. Appl. No. 11/275,479 as of Oct. 30, 2008, pp 1-4.

Pending Claims from U.S. Appl. No. 11/275,480 as of Oct. 20, 2008, pp. 1-3.

Non-Final Office Action issued in U.S. Appl. No. 11/275,477 (Oct. 16, 2008).

Non-Final Office Action issued in U.S. Appl. No. 11/275,479 (Oct. 17, 2008).

Non-Final Office Action issued in U.S. Appl. No. 11/275,480 (May 13, 2008).

* cited by examiner

METHOD FOR OPERATING A GAS TURBINE AND A GAS TURBINE FOR IMPLEMENTING THE METHOD

This application claims priority under 35 U.S.C. § 119 to U.S. provisional application No. 60/706,777, filed 10 Aug. 2005, the entirety of which is incorporated by reference herein.

BACKGROUND OF THE INVENTION

1. Field of the Invention

The present invention relates to the field of power plant technology. It pertains to a method for operating a (stationary) gas turbine according, as well as a gas turbine for implementing the method.

2. Brief Description of the Related Art

A gas turbine with reheating (reheat gas turbine) is known (see, for example, the U.S. Pat. No. 5,577,378 or "State-of-the-art gas turbines—a brief update," ABB Review 02/1997, FIG. 15, turbine type GT26), which combines flexible operation with very low flue gas emission values.

The machinery architecture of the gas turbine of Type GT26 is unique and is exceptionally well-suited to realizing a concept that is the subject matter of the present invention, because:

- even in the case of the compressor, there is a significant diversion of compressor air at intermediate compressor pressures,
- the concept of sequential combustion renders an increased stability of combustion possible in conjunction with reduced levels of excess oxygen, and
- a secondary air system is present, which renders it possible to divert air from the compressor, to cool it down, and to use the cooled air for cooling the combustor and the turbine.

The principle of the known gas turbine with reheating is shown in FIG. 1. The gas turbine 11, which is a portion of a combined cycle power plant 10, includes two connected compressors, arranged behind one another on a commonly shared shaft 15, namely a low pressure compressor 13 and a high pressure compressor 14, as well as two combustors, namely a high pressure combustor 18 and a reheat combustor 19, and the pertinent turbines, namely a high pressure turbine 16 and a low pressure turbine 17. The shaft 15 drives a generator 12.

The manner in which the unit works is as follows: air is drawn in via an air inlet 20 from the low pressure compressor 13, and is compressed initially to a level of intermediate pressure (ca. 20 bar). The high pressure compressor 14 then further compresses the air to a level of high pressure (ca. 32 bar). Cooling air is diverted at both the level of intermediate pressure and at the level of high pressure and cooled down in pertinent OTC coolers (OTC=Once Through Cooler) 23 and 24 and conducted further to the combustors 18 and 19 and turbines 16, 17 via cooling lines 25 and 26 for cooling purposes. The remaining air from the high pressure compressor 14 is conducted to the high pressure combustor 18 and heated there by the burning of a fuel, which is introduced via the fuel feedline 21. The resultant flue gas is then expanded in the downstream high pressure turbine 16 to an intermediate level of pressure as it performs work. After expansion, the flue gas is reheated in the reheat combustor 19 by the burning of a fuel that is introduced via fuel feedline 22 before it is expanded in the downstream low pressure turbine 17, performing additional work in the process.

The cooling air, which flows through the cooling lines 25, 26, is sprayed in at suitable points of the combustors 18, 19 and turbines 16, 17 to limit material temperatures to a reasonable degree. The flue gas, which comes from the low pressure turbine 17, is sent through a heat recovery steam generator 27 (HRSG) in order to generate steam, which flows within a water-steam circuit through a steam turbine 29 and performs additional work there. After flowing through the heat recovery steam generator 27, the flue gas is finally released to the outside through a flue gas line 28. The OTC coolers 23, 24 are a portion of the water-steam circuit; superheated steam is generated at their outlets.

As a result of the two combustions in the combustors 18 and 19, which are independent of each other and follow one another, great flexibility of operation is achieved; the combustor temperatures can be adjusted in such a way that the maximum degree of efficiency is achieved within the existing limits. The low flue gas levels of the sequential combustion system are provided by the inherently low emission levels, which can be achieved in the course of reheating (under certain conditions, the second combustion even leads to a consumption of NOx).

On the other hand, combined cycle power plants with single stage combustion in the gas turbines are known (see, for example, U.S. Pat. Nos. A4,785,622 or B26,513,317), in which a coal gasification unit is integrated in order to provide the requisite fuel for the gas turbine in the form of syngas, which is recovered from coal. Such combined cycle power plants are designated IGCC (Integrated Gasification Combined Cycle) plants.

The present invention now proceeds from the recognition that due to the use of gas turbines with reheating in an IGCC plant, the advantages of this type of gas turbine can be made usable for the plant in a particular manner.

SUMMARY OF THE INVENTION

It is one of the invention's tasks to indicate a method for the operation of a gas turbine that works in concert with a coal gasifier, which is characterized by an improved degree of efficiency, which can also be realized to particularly good effect using available components, as well as to create a gas turbine for implementing the method.

It is particularly advantageous that a gas turbine with reheating be used in a gas turbine unit that works with syngas from a coal gasifier, which includes two combustors and two turbines, in which, in the first combustor, syngas is burned employing the compressed air, and the resultant hot gases are expanded in the first turbine, and in which syngas is burned in the second combustor, using the gases that come from the first turbine, and the resultant hot gases are expanded in the second turbine, and the nitrogen that occurs in the separation of the air is used to cool the gas turbine. The solution according to the invention has the following advantages:

- No OTC cooler is required, as a result of which the degree of efficiency is increased.
- Less cooling air is required, which is also to the good of the degree of efficiency.
- The comparatively cold nitrogen from the air separation unit can be used to cool critical components, whereas the warmer air from the compressor can be used to cool less critical components; this, too, improves the unit's degree of efficiency.
- The cooling described can be realized especially simply in the case of gas turbines with reheating of the known structural type, such as the type GT26 gas turbine, for example, due to the specific secondary air system.

One embodiment of the method according to the invention is characterized in that the gas turbine includes a first compressor for the purpose of compressing intaken air to an initial pressure stage, and a second compressor to compress the air further from the initial pressure stage to a second, higher pressure stage, that a portion of the air coming from the initial compressor is separated into oxygen and nitrogen, and that the nitrogen that occurs in the course of this separation is used to cool the second combustor and second turbine.

In the process, in particular, a portion of the compressed air that is diverted from the initial compressor for the separation is diverted prior to the separation, and mixed with the nitrogen, which occurs in the course of the separation and is provided for cooling purposes. Particularly favorable circumstances arise if about 50% of the compressed air that is diverted for the separation is diverted from the initial compressor prior to the separation and mixed with the nitrogen that occurs in the course of separation, which is also provided for cooling purposes. Preferably, the nitrogen that occurs in the course of separation is compressed prior to mixing with the compressed air that was diverted prior to separation.

An embodiment of the gas turbine according to the invention is characterized in that a branching line is provided, which branches off from the inlet side of the air separation unit and discharges into the nitrogen line at a point provided, and that in the nitrogen line, between the outlet of the air separation unit and the prescribed discharge point of the branching line, a compressor is provided to compress the nitrogen.

Preferably, the gas turbine exhibits two compressors, connected behind one another, the air separation unit is attached on the side of its input, to the outlet of the first compressor, and the nitrogen line is led to the second combustor and to the second turbine.

The air separation unit, particularly on the side of its outlet, exhibits an oxygen line to give off the oxygen that occurs in the course of the separation, which is led to a unit for the production of syngas by means of gasifying coal, and that a syngas input line transports the syngas that is generated from the syngas production unit to the combustors.

BRIEF DESCRIPTION OF THE DRAWINGS

In what follows, the invention is to be explained in greater detail by virtue of the embodiment examples in conjunction with the drawings.

DETAILED DESCRIPTION OF EXEMPLARY EMBODIMENTS

Figure 1:
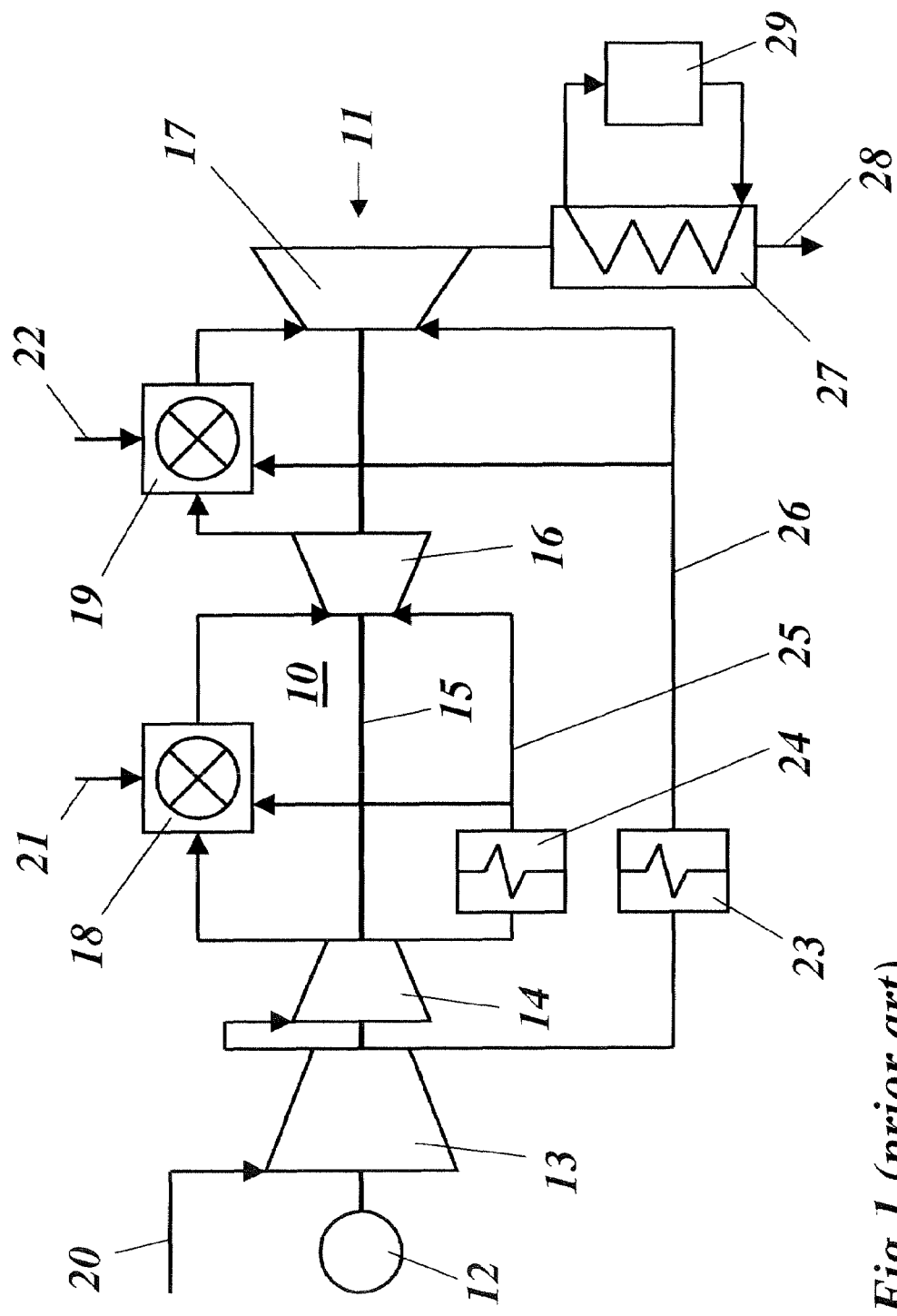
FIG. 1 shows the simplified schematic of a combined cycle power plant with a gas turbine with reheating or sequential combustion according to the prior art, respectively.
Figure 2:
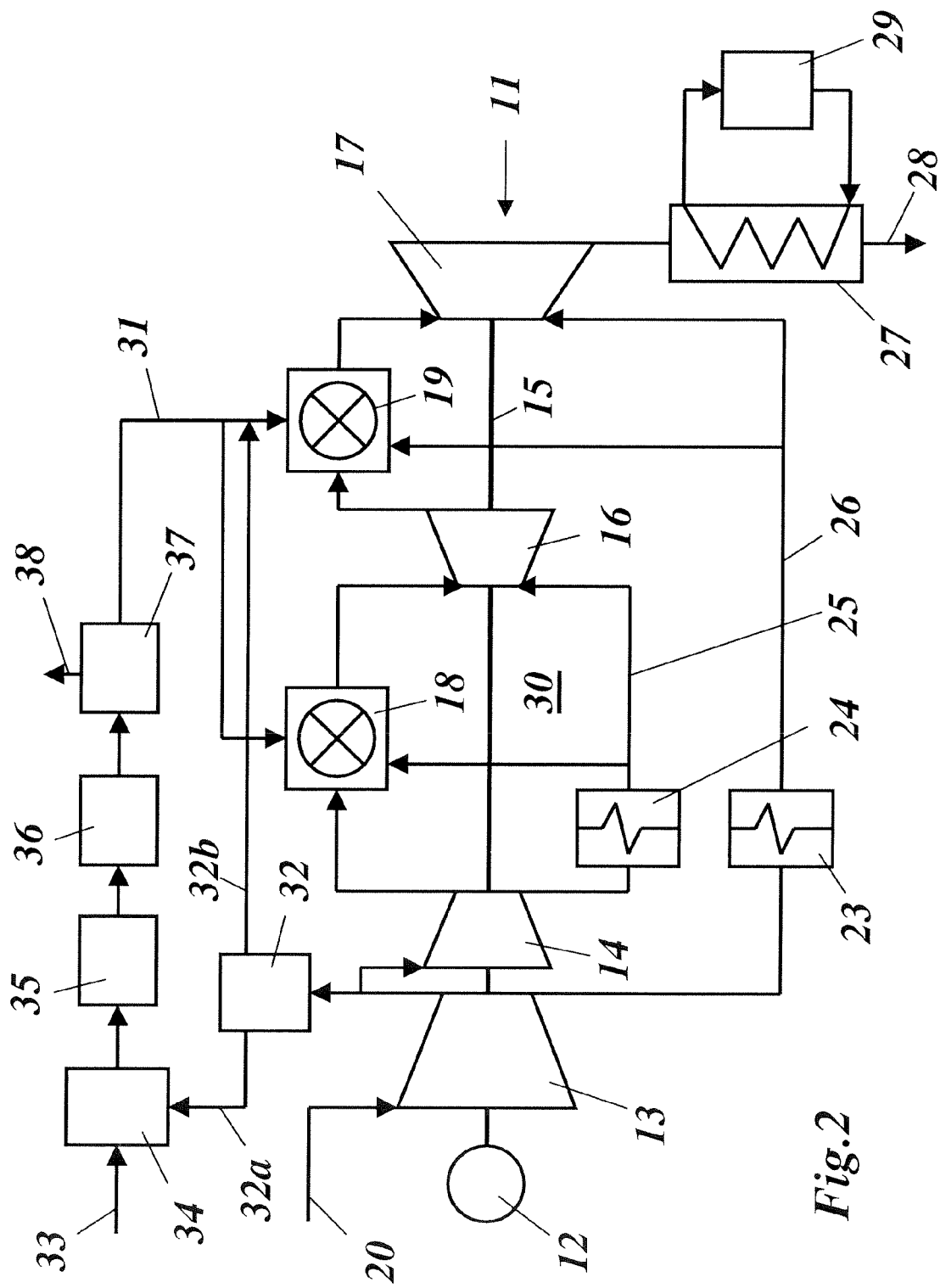
FIG. 2 shows the simplified schematic of an IGCC unit with a gas turbine with reheating or sequential combustion, respectively, as it is suitable for realizing the invention.

In FIG. 2, in a markedly simplified schematic, an IGCC unit with a gas turbine with reheating, or sequential combustion, respectively, is shown, as it is suitable for realizing the invention. The combined cycle power plant 30 includes a gas turbine 11 with a low pressure compressor 13, a downstream high pressure compressor, 14, a high pressure combustor 18 with a downstream high pressure turbine 16 and a reheat combustor 19 with a downstream low pressure turbine 17. The compressors 13, 14 and the turbines 16, 17 sit on a commonly shared shaft 15, by which a generator 12 is driven.

The combustors 18 and 19 are supplied, via a syngas feed line 31, with syngas as fuel, which is produced by gasifying coal (coal feeding 33) in a coal gasifier 34. A cooling device 35 for the syngas, a filtering device 36, and a $CO_2$ separator 37 with a $CO_2$ outlet 38 to release the $CO_2$ that is given off top the coal gasifier 34, are included.

Oxygen ($O_2$), which is recovered in an air separation unit 32, and is added via an oxygen line 32a, is used to gasify coal in the coal gasifier 34. The air separation unit 32 receives compressed air from the outlet of the low pressure compressor 13. The nitrogen, ($N_2$), which also occurs in the course of separation, is led via a nitrogen line 32b, for example, to the low pressure combustor 19.

For cooling the components of the combustors 18, 19 and turbines 16, 17 that are exposed to the hot gas, compressed cooling air is drawn off at the outlets of both compressors 13 and 14, cooled off in a topped OTC cooler 23 or 24, respectively, and then led, via corresponding cooling lines 25 and 26, to those points that are to be cooled.

At the outlet of the low pressure turbine 17, a heat recovery steam generator 27 is provided, which, together with a connected steam turbine 29, is part of a water-steam circuit. The flue gas that escapes from the heat recovery steam generator 27 is released to the outside by way of a flue gas line 28.

Figure 3:
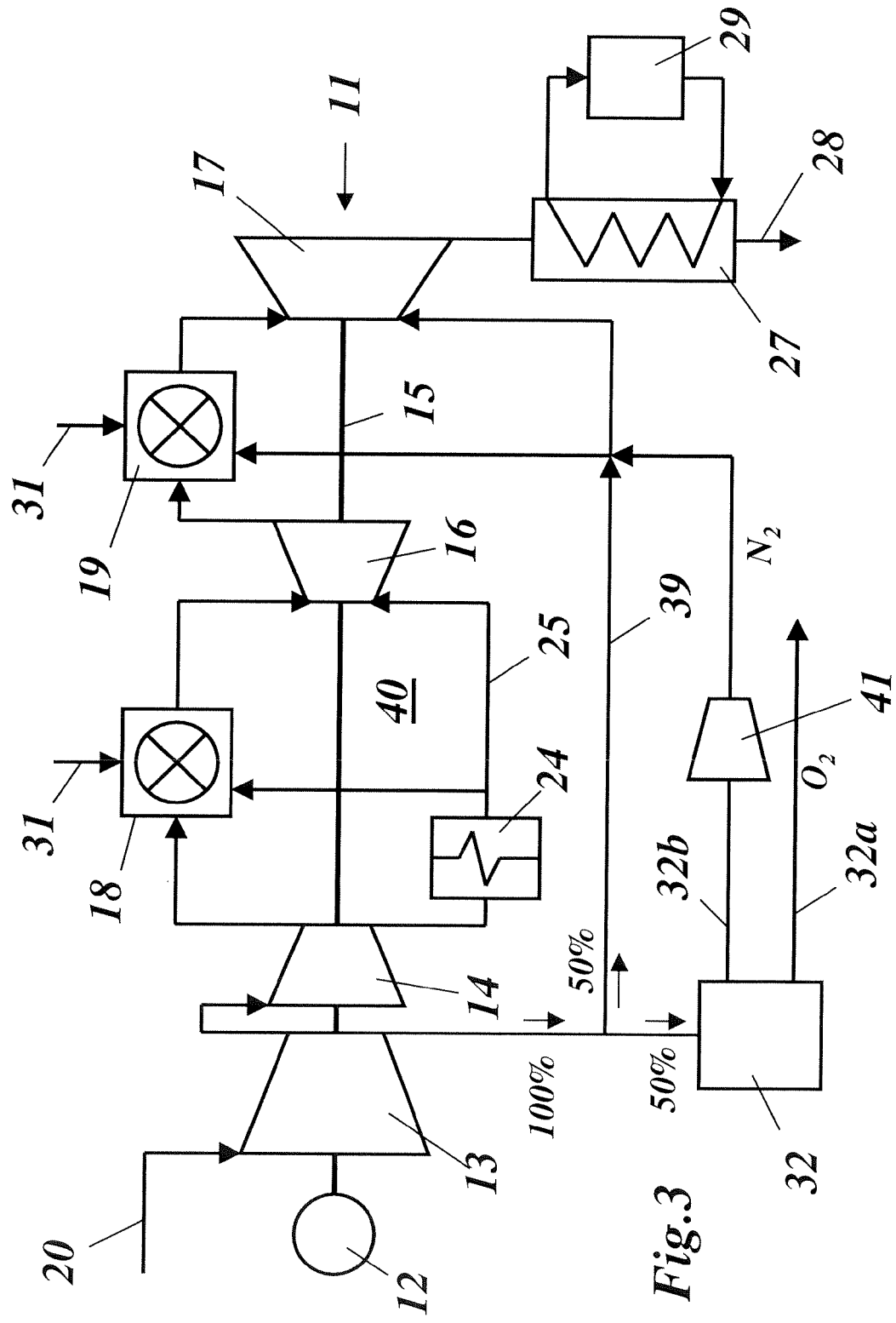
FIG. 3 shows an embodiment example for cooling according to the invention using the nitrogen that is recovered in the separation of the air in a unit of the type depicted in FIG. 2.

In such a configuration of the unit, according to FIG. 3, the position of the cooling is now changed. In the combined cycle power plant 40 of FIG. 3, now, as before, the high pressure combustor 18 and the high pressure turbine 16 are cooled by compressed air, which is diverted at the outlet of the high pressure compressor 14 and then cooled down in an OTC cooler 24. The cooling of the reheat combustor 19 and the low pressure turbine 17, now takes place in a different manner, however. To this end, at the outlet of the low pressure compressor 13, 50% of the diverted compressed air is separated into oxygen and nitrogen in the air separation unit 32. The other 50% is led past the air separation unit 32 in a branching line 39. The oxygen, which is drawn off from the air separation unit 32 via oxygen line 32a is, as is shown in FIG. 2, used to gasify the coal. The relatively cool nitrogen that is produced is led through the nitrogen line 32b to a compressor 41 and after compression, mixed with the 50% of the air from the branching line 39. After mixing, the gas temperature is about 300-400° C., so that cooling the cooling air that is extracted at the low pressure compressor 13 is not necessary. The resultant mixture is then used to cool the hot components of the reheat combustor 19 and the low pressure turbine 17.

The advantages of this type of cooling are:

No OTC cooler is needed, as a result of which the degree of efficiency is increased.

Less cooling air is needed, which also benefits the degree of efficiency.

The comparatively cold nitrogen from the air separation unit can be used to cool critical components, whereas the warmer air from the compressor can be used to cool less critical components; this, too, improves the unit's degree of efficiency.

The cooling described can be realized particularly simply in the case of gas turbines with reheating of the known type of construction, such as, for example, the type GT26 gas turbine, because of the specific secondary air system.

A prerequisite for the realization of this concept is that in the gas turbine's two combustors, undiluted coal gas can be used. The main technical challenges associated with the combustion of such undiluted coal gas in the combustor of a gas turbine are:

The achievement of low emission levels,

Sufficient distance from the limits of flashbacks and pulsations,

Maintaining operational flexibility in the event of changes in the quality of the coal gas as well as the possibility of support with other fuels (natural gas or oil), and The drawing off and feeding in of cooling air into the areas of the heating gas channel in the combustor and in the turbine.

In the case of IGCC units, from conception onward, these challenges can be overcome particularly well by means of a gas turbine with reheating for the following reasons:

1. The inherent advantage associated with reheating with respect to NOx can also be transferred to syngas if the combustion temperatures in both combustors are selected so as to be optimal, especially with a moderated temperature increase in the initial stage (high pressure combustor 18).

2. The stability of combustion and the operational flexibility in the case of the gas turbine with reheating are greater than in the case of a comparable gas turbine with single stage combustion. The operational limits are typically set by the extinguishing and flashback of the flame and/or emission levels for any given flame temperature, which gives rise to a permitted range of fuel qualities and fuel reactivity levels. In the gas turbine with reheating, this operational limit is clearly increased because two combustion systems render operation in conjunction with two independent flame temperatures possible, e.g. with a lower temperature in the initial stage and a higher temperature in the second stage, with slight disadvantages with respect to NOx.

3. The requirements with respect to gas pressure can be minimized if the fuel gas is injected undiluted (without nitrogen) into the initial and the second combustion systems, which typically work with pressures in the range of >30 bar, or between 15 and 20 bar, respectively.

4. The concept of the extraction of cooling air, which is subsequently cooled down and fed into the machine again, lends itself particularly well to the use of nitrogen as a cooling medium.

LIST OF REFERENCE SIGNS

10,30,40 combined cycle power plant
11 gas turbine
12 generator
13 low pressure compressor
14 high pressure compressor
15 shaft (gas turbine)
16 high pressure turbine
17 low pressure turbine
18 high pressure combustor
19 reheat combustor
20 air inlet
21,22 fuel feedline
23,24 OTC cooler
25,26 cooling line
27 heat recovery steam generator
28 flue gas line
29 steam turbine (steam cycle)
31 syngas feed line
32 air separation unit
32a oxygen line
32b nitrogen line
33 coal feeding
34 coal gasifier
35 cooling device
36 filtering device
37 $CO_2$ separator
38 $CO_2$ outlet
39 branching line
41 compressor While the invention has been described in detail with reference to exemplary embodiments thereof, it will be apparent to one skilled in the art that various changes can be made, and equivalents employed, without departing from the scope of the invention.

The invention claimed is:

1. A method for operating a gas turbine, the method comprising:

drawing in and compressing air with the gas turbine;

conducting compressed air to a combustor;

combusting a syngas that is generated from coal with said compressed air in said combustor to generate hot gases;

expanding the hot gases that occur in the course of combustion in a downstream turbine as said hot gases perform work;

separating a portion of the compressed air into oxygen and nitrogen;

conducting said separated oxygen to and using said separated oxygen in a coal gasifier to produce syngas;

conducting a portion of said compressed air to said gas turbine to cool parts of the gas turbine exposed to hot gases;

wherein said gas turbine comprises a gas turbine with reheating including two combustors and two turbines, wherein in a first combustor of said two combustors, said syngas is combusted using said compressed air and the resultant hot gases are expanded in a first turbine, and wherein in a second combustor of said two combustors, said syngas is combusted using the gases coming out of the first turbine and the resultant hot gases are expanded in a second turbine;

cooling the gas turbine with the nitrogen that occurs in the separation of the air;

wherein the gas turbine comprises a first compressor for compressing drawn-in air to an initial pressure stage and a second compressor for compressing the air further from the initial pressure stage to a second, higher pressure stage;

cooling said first combustor and said first turbine directly with compressed air from said first compressor;

separating a portion of the air coming from the first compressor into oxygen and nitrogen; and using the nitrogen that occurs in the course of said separating to cool the second combustor and second turbine.

2. A method according to claim 1, further comprising:

diverting a portion of said compressed air from the first compressor and prior to said separating;

mixing said diverted portion of said compressed air with said nitrogen from said separating, to form a mixture of compressed air and nitrogen; and cooling said second combustor and gas turbine with said mixture.

3. A method according to claim 2, wherein diverting a portion of said compressed air comprises diverting about 50% of the compressed air.

4. A method according to claim 2, further comprising:

compressing the nitrogen from said separating prior to mixing with said diverted air portion.

\* \* \* \* \*